US011239476B2

(12) United States Patent
Yoshitomi

(10) Patent No.: US 11,239,476 B2
(45) Date of Patent: Feb. 1, 2022

(54) FUEL CELL SYSTEM AND FUEL CELL VEHICLE

(71) Applicant: HONDA MOTOR CO., LTD., Tokyo (JP)

(72) Inventor: Ryoichi Yoshitomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 16/796,967

(22) Filed: Feb. 21, 2020

(65) Prior Publication Data

US 2020/0274175 A1 Aug. 27, 2020

(30) Foreign Application Priority Data

Feb. 25, 2019 (JP) .............................. JP2019-031166

(51) Int. Cl.
*H01M 8/04007* (2016.01)
*H01M 8/04082* (2016.01)
*H01M 8/04701* (2016.01)
*H01M 8/04089* (2016.01)

(52) U.S. Cl.
CPC ... *H01M 8/04007* (2013.01); *H01M 8/04097* (2013.01); *H01M 8/04201* (2013.01); *H01M 8/04708* (2013.01); *H01M 2250/20* (2013.01)

(58) Field of Classification Search
CPC ......... H01M 8/04007; H01M 8/04201; H01M 8/04708; H01M 8/04097; H01M 2250/20
See application file for complete search history.

(56) References Cited

U.S. PATENT DOCUMENTS

| 2009/0014089 | A1* | 1/2009 | Takeshita ................ F17C 13/04 141/192 |
| 2009/0208798 | A1* | 8/2009 | Kim ................... H01M 8/04126 429/413 |
| 2010/0227230 | A1* | 9/2010 | Goebel .............. H01M 8/04119 429/414 |
| 2015/0079489 | A1* | 3/2015 | Noh ................... H01M 8/04126 429/434 |
| 2018/0151904 | A1* | 5/2018 | Nakata ................ H01M 8/0625 |

FOREIGN PATENT DOCUMENTS

JP 2017-084457 5/2017

* cited by examiner

*Primary Examiner* — Stewart A Fraser
(74) *Attorney, Agent, or Firm* — Amin, Turocy & Watson, LLP

(57) ABSTRACT

A fuel cell system of a fuel cell vehicle includes an injector device disposed side by side with a fuel cell stack in a stacking direction of a plurality of power generation cells, and a heat exchanger. The injector device includes an injector body, and a support part. The support part has a fuel gas inlet channel, and supports the injector body. The heat exchanger is fixed to the support part.

10 Claims, 10 Drawing Sheets

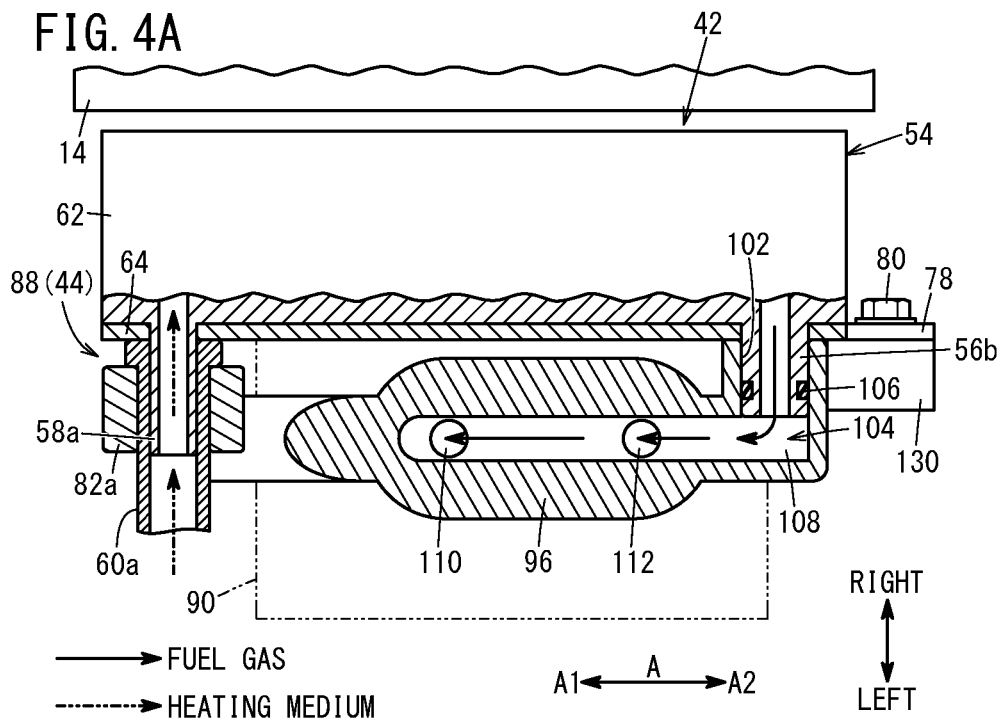
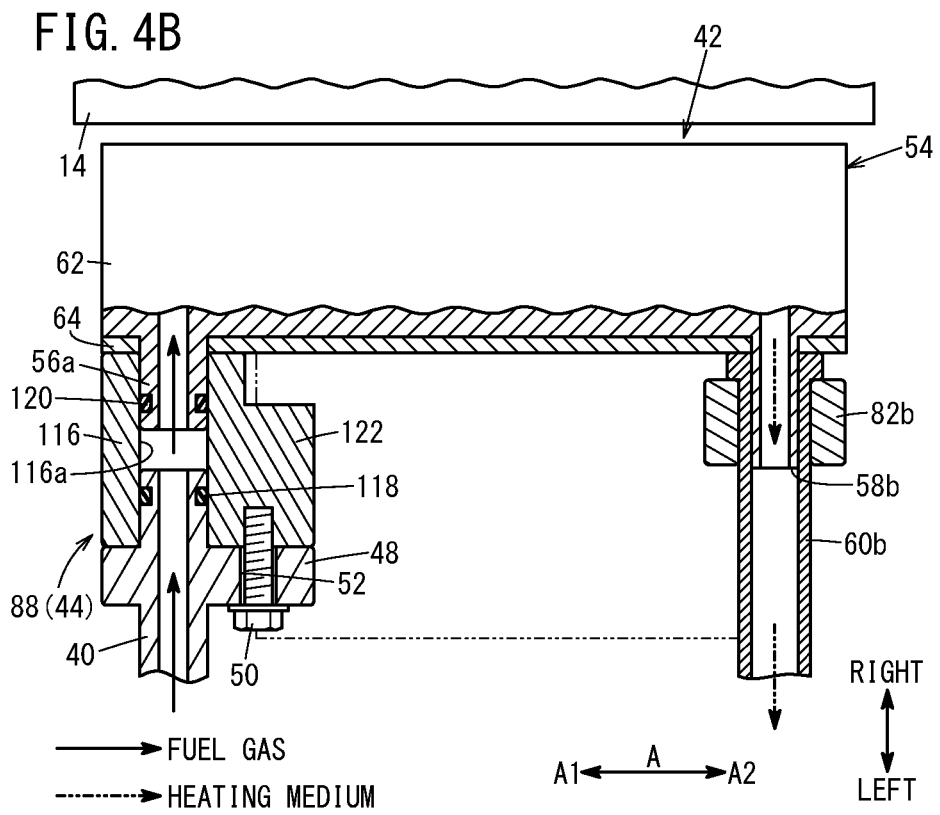

10A (12A)

FUEL CELL SYSTEM AND FUEL CELL VEHICLE

CROSS-REFERENCE TO RELATED APPLICATION

This application is based upon and claims the benefit of priority from Japanese Patent Application No. 2019-031166 filed on Feb. 25, 2019, the contents of which are incorporated herein by reference.

BACKGROUND OF THE INVENTION

Field of the Invention

The present invention relates to a fuel cell system and a fuel cell vehicle including a fuel gas supply apparatus for supplying a fuel gas to a fuel cell stack formed by stacking a plurality of power generation cells together.

Description of the Related Art

For example, Japanese Laid-Open Patent Publication No. 2017-084457 discloses a fuel cell vehicle equipped with a fuel cell system. This fuel cell system discloses structure where the fuel cell stack and the injector device are provided side by side in a stacking direction (vehicle width direction) of a plurality of power generation cells.

SUMMARY OF THE INVENTION

In this regard, the fuel gas supply apparatus may include a heat exchanger for heating a fuel gas to be supplied to the injector device. In this case, it is desired that the injector device and the heat exchanger are arranged in a compact manner. Further, in the case where the fuel cell and the injector device are coupled together by pipes, there is a concern that the weight and the cost of the fuel cell vehicle are increased.

The present invention has been made taking such a problem into account, and an object of the present invention is to provide a fuel cell system and a fuel cell vehicle in which it is possible to reduce the weight and cost of a fuel gas supply apparatus, and dispose an injector device and a heat exchanger in a compact manner.

According to one aspect of the present invention, a fuel cell system is provided. The fuel cell system includes a fuel gas supply apparatus configured to supply a fuel gas to a fuel cell stack containing a plurality of power generation cells stacked together in a stacking direction. The fuel gas supply apparatus includes an injector device disposed side by side with the fuel cell stack in the stacking direction of the plurality of power generation cells, and a heat exchanger configured to heat a fuel gas that is guided to the injector device. The injector device includes an injector body, and a support part having a fuel gas inlet channel for introducing the fuel gas into the injector body, and configured to support the injector body. The heat exchanger is fixed to the support part.

According to another aspect of the present invention, a fuel cell vehicle including the above described fuel cell system is provided. The fuel cell system is disposed in a manner that the stacking direction is oriented in the vehicle width direction of the fuel cell vehicle.

In the present invention, since the heat exchanger is fixed to the support part of the injector device, it is possible to eliminate the need to arrange the pipes for coupling the heat exchanger and the support part. Therefore, it is possible to reduce the weight and the cost of the fuel gas supply apparatus, and arrange the injector device and the heat exchanger in a compact manner.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4A is a lateral cross sectional view taken along a line IVA-IVA in FIG. 3;

FIG. 4B is a lateral cross sectional view taken along a line IVB-IVB in FIG. 3;

DESCRIPTION OF THE PREFERRED EMBODIMENTS

Hereinafter, preferred embodiments of a fuel cell system and a fuel cell vehicle according to the present invention will be described with reference to the accompanying drawings.

First Embodiment

Figure 1:
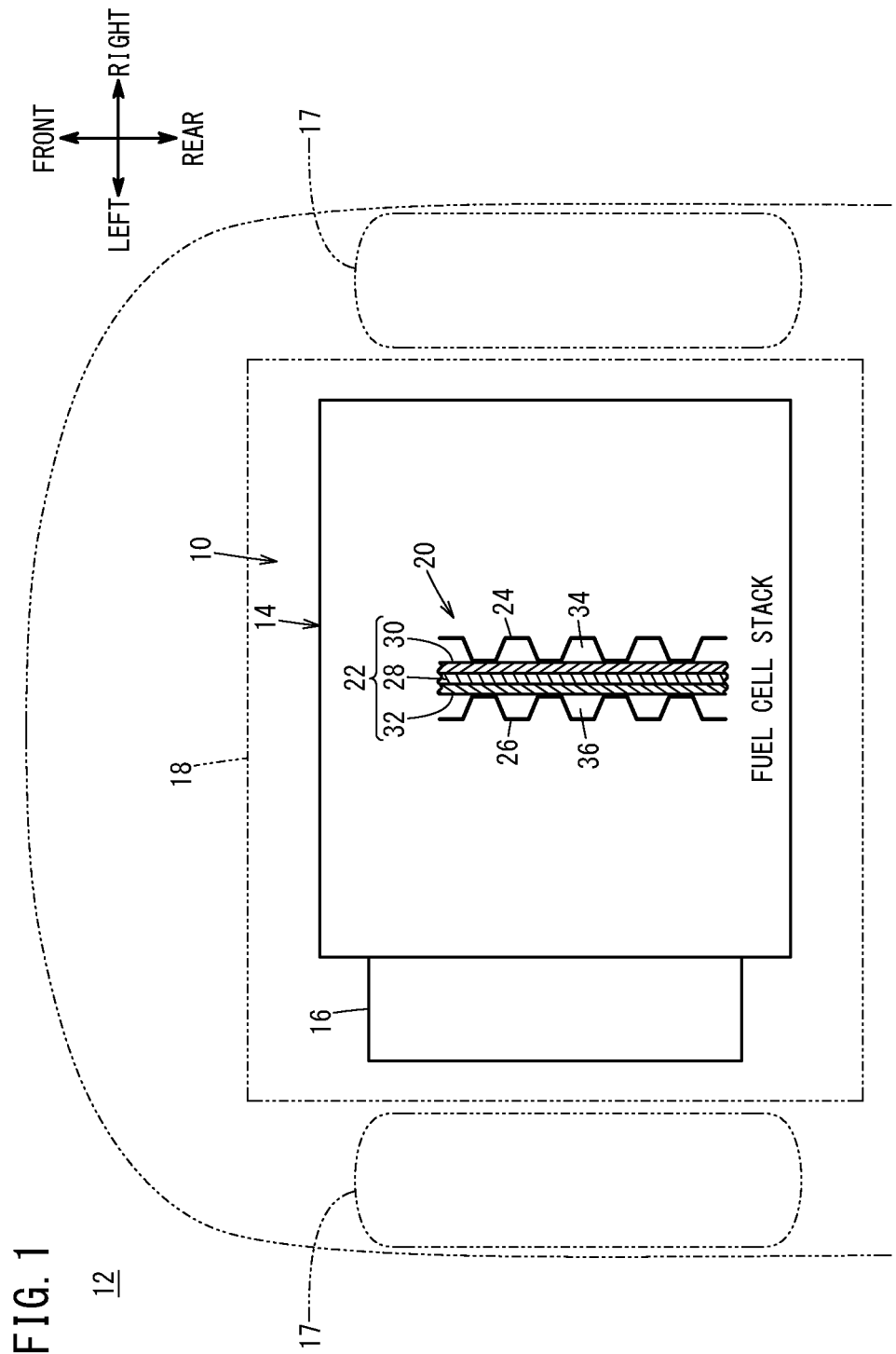
FIG. 1 is a schematic view with partial omission showing a fuel cell vehicle including a fuel cell system according to a first embodiment of the present invention.

As shown in FIG. 1, a fuel cell vehicle 12 according to a first embodiment of the present invention is a fuel cell electric automobile equipped with a fuel cell system 10. The fuel cell system 10 includes a fuel cell stack 14, a fuel gas supply apparatus 16 for supplying a fuel gas (e.g., hydrogen gas) to the fuel cell stack 14, and an oxygen-containing gas supply apparatus (not shown) for supplying an oxygen-containing gas (such as the air) to the fuel cell stack 14.

The fuel cell stack 14 is provided in a motor room 18 adjacent to front wheels 17. The fuel cell stack 14 includes a plurality of power generation cells 20 stacked together in a vehicle width direction (horizontal direction). Each power generation cell 20 is formed by sandwiching a membrane electrode assembly 22 between a first separator 24 and a second separator 26. The first separator 24 and the second separator 26 are metal separators or carbon separators.

The membrane electrode assembly 22 includes a solid polymer electrolyte membrane 28, and an anode 30 and a cathode 32 sandwiching the solid polymer electrolyte membrane 28. For example, the solid polymer electrolyte membrane 28 is a thin membrane of perfluorosulfonic acid containing water. A fluorine based electrolyte or an HC (hydrocarbon) based electrolyte may be used as the solid polymer electrolyte membrane 28.

A fuel gas flow field 34 for guiding a fuel gas to the anode 30 is provided between the first separator 24 and the membrane electrode assembly 22. An oxygen-containing gas flow field 36 for supplying an oxygen-containing gas to the cathode 32 is provided between the second separator 26 and the membrane electrode assembly 22.

The fuel gas supply apparatus 16 is provided on one of the end surfaces of the fuel cell stack 14 (an end surface on the left side of the vehicle). Stated otherwise, the fuel gas supply apparatus 16 and the fuel cell stack 14 are provided side by side in the vehicle width direction (the stacking direction of the plurality of power generation cells 20 or the longitudinal direction of the fuel cell stack 14). That is, the fuel gas supply apparatus 16 is provided in a limited space beside the fuel cell stack 14 in the motor room 18.

Figure 2:
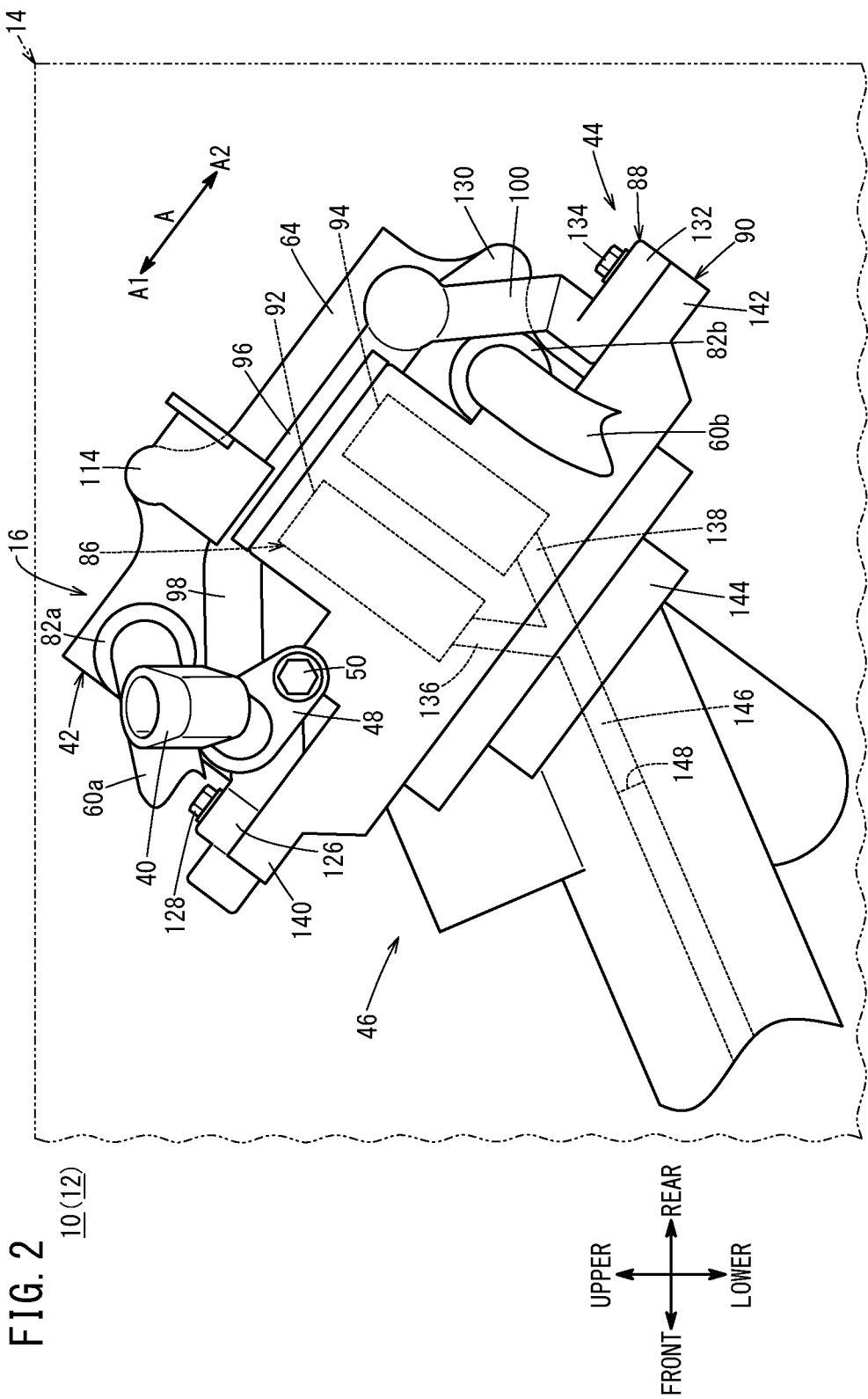
FIG. 2 is a front view showing a fuel gas supply apparatus.

As shown in FIG. 2, the fuel gas supply apparatus 16 includes a fuel gas supply pipe 40, a heat exchanger 42, an injector device 44, and an ejector device 46.

Figure 3:
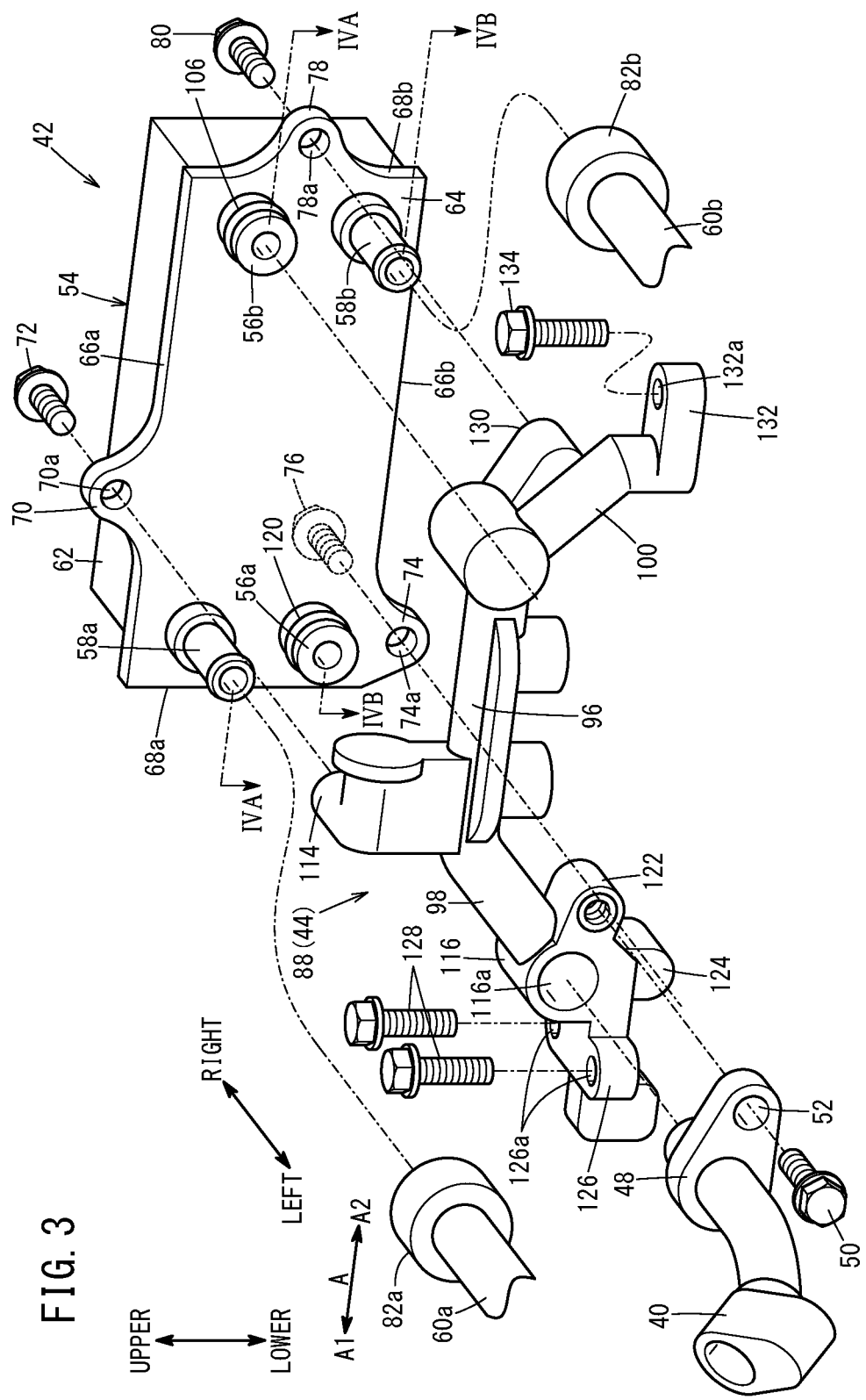
FIG. 3 is an exploded perspective view showing a fuel gas supply pipe, a heat exchanger, and a support part.

As shown in FIGS. 2 and 3, the fuel gas supply pipe 40 guides the fuel gas of a fuel gas tank (hydrogen tank) (not shown) to the heat exchanger 42. A flange-shaped pipe fixing part 48 extending outward is provided at an end of the fuel gas supply pipe 40. The pipe fixing part 48 has, formed therein, an insertion hole 52 (see FIG. 3) into which a pipe fastening member 50 such as a screw member is inserted.

As shown in FIGS. 2 to 4B, the heat exchanger 42 heats the fuel gas guided from the fuel gas supply pipe 40 (fuel gas guided to the injector device 44). The heat exchanger 42 is fixed to a support part 88 described later, of the injector device 44. In FIG. 3, the heat exchanger 42 includes a heat exchanger body 54, a fuel gas inlet part 56a, a fuel gas outlet part 56b, a heating medium inlet part 58a, a heating medium outlet part 58b, a heating medium supply pipe 60a, and a heating medium discharge pipe 60b.

The heat exchanger body 54 has a rectangular parallelepiped shape. Though not shown, a channel for the fuel gas and a channel for the heating medium are formed in the heat exchanger body 54. As the heating medium used in the heat exchanger 42, for example, water that is warmed when it flows through the fuel cell stack 14 is used. However, any fluid may be used as the heating medium.

The heat exchanger body 54 is provided in a space between the support part 88 of the injector device 44 and the fuel cell stack 14 (see FIGS. 4A and 4B). The heat exchanger body 54 includes a container part 62 having a thickness in the left-right direction (vehicle width direction) and a plate shaped lid part 64 fixed to the container part 62. The container part 62 and the lid part 64 extend in one direction (indicated by the arrow A). The lid part 64 is positioned on a side of the container part 62 closer to the support part 88 of the injector device 44 (i.e., a side remote from the fuel cell stack 14).

The lid part 64 has a rectangular parallelepiped shape in a plan view. That is, the lid part 64 includes a first long side 66a positioned at an upper position, a second long side 66b positioned at a lower position, a first short side 68a positioned at one end of the lid part 64 (vehicle front side in the direction indicated by an arrow A1), and a second short side 68b positioned at the other end of the lid part 64 (vehicle rear side in the direction indicated by an arrow A2).

A first fixing part 70 is provided at an intermediate portion of the first long side 66a in an extension direction in which the first long side 66a extends. The first fixing part 70 protrudes in a direction away from the second long side 66b. The first fixing part 70 has, formed therein, a first insertion hole 70a into which a first fastening member 72 such as a screw member is inserted. A second fixing part 74 is provided at one end of the second long side 66b in an extension direction in which the second long side 66b extends. The second fixing part 74 protrudes in a direction away from the first long side 66a. The second fixing part 74 has, formed therein, a second insertion hole 74a into which a second fastening member 76 such as a screw member is inserted. A third fixing part 78 is provided at an intermediate portion of the second short side 68b in an extension direction in which the second short side 68b extends. The third fixing part 78 protrudes in a direction away from the first short side 68a. The third fixing part 78 has, formed therein, a third insertion hole 78a into which a third fastening member 80 such as a screw member is inserted.

At one end of the lid part 64 in the longitudinal direction, the heating medium inlet part 58a and the fuel gas inlet part 56a are arranged in the lateral direction (short side direction) of the lid part 64. At the other end of the lid part 64 in the longitudinal direction, the fuel gas outlet part 56b and the heating medium outlet part 58b are arranged in the lateral direction (short side direction) of the lid part 64.

As shown in FIGS. 3 and 4B, the fuel gas inlet part 56a protrudes from the heat exchanger body 54 toward the support part 88, and guides or introduces the fuel gas from the fuel gas supply pipe 40 into the heat exchanger body 54. In FIG. 3 and FIG. 4A, the fuel gas outlet part 56b protrudes from the heat exchanger body 54 toward the support part 88, and guides or discharges the fuel gas from the inside of the heat exchanger body 54 to the outside.

The heating medium inlet part 58a protrudes from the heat exchanger body 54 toward the support part 88, and guides or introduces the heating medium into the heat exchanger body 54. An end of the heating medium supply pipe 60a is coupled to the heating medium inlet part 58a. An annular inlet side holder member 82a for holding coupling between the heating medium inlet part 58a and the heating medium supply pipe 60a is provided around the outer peripheral portion of coupling part between the heating medium inlet part 58a and the heating medium supply pipe 60a.

In FIGS. 3 and 4B, the heating medium outlet part 58b protrudes from the heat exchanger body 54 toward the support part 88, and discharges the heating medium from the inside of the heat exchanger body 54. An end of the heating medium discharge pipe 60b is coupled to the heating medium outlet part 58b. An annular outlet side holder member 82b for holding coupling between the heating medium outlet part 58b and the heating medium discharge pipe 60b is provided around the outer peripheral portion of coupling part between the heating medium outlet part 58b and the heating medium discharge pipe 60b.

As shown in FIG. 2, the injector device 44 is disposed side by side with the fuel cell stack 14 in the stacking direction of the plurality of power generation cells 20 (vehicle width direction). Specifically, the injector device 44 is fixed to an end surface of the fuel cell stack 14 by a fixing member such as a screw member (not shown).

The injector device 44 includes an injector body 86, a support part 88 provided on the heat exchanger 42, and a holder part 90 provided on the support part 88 for holding the injector body 86.

The injector body 86 includes a first injector 92 and a second injector 94. Each of the first injector 92 and the second injector 94 injects the fuel gas heated by the heat exchanger 42 toward the downstream side.

As shown in FIG. 3, the support part 88 includes a support part body 96, a first arm 98, and a second arm 100. The support part body 96 extends in the direction indicated by the arrow A. In FIG. 4A, the support part body 96 includes an insertion hole 102 into which the fuel gas outlet part 56b is inserted, and a fuel gas inlet channel 104 for guiding or introducing the fuel gas heated by the heat exchanger 42 into the first injector 92 and the second injector 94.

The wall surface of the insertion hole 102 tightly contacts an annular seal member 106 provided on an outer peripheral surface of the fuel gas outlet part 56b in an air tight manner. That is, the fuel gas outlet part 56b is directly coupled to the support part body 96. In the state where the fuel gas outlet part 56b is inserted into the insertion hole 102, the inner hole of the fuel gas outlet part 56b communicates with the fuel gas inlet channel 104.

The fuel gas inlet channel 104 includes a long hole 108 extending in the direction indicated by the arrow A, and a first inlet hole 110 and a second inlet hole 112 communicating with the long hole 108. The first inlet hole 110 guides the fuel gas in the long hole 108 into the first injector 92. The second inlet hole 112 guides the fuel gas in the long hole 108 into the second injector 94.

In FIG. 3, a first fixed part 114 is provided at one end of the support part body 96. A first fixing part 70 is coupled to the first fixed part 114 by the first fastening member 72. The first arm 98 extends from one end of the support part body 96 in the direction indicated by the arrow A1. A connector part 116 is provided at an extended end of the first arm 98. An end of the fuel gas supply pipe 40 is connected to the connector part 116.

As shown in FIGS. 3 and 4B, a through hole 116a is formed in the connector part 116. Stated otherwise, the connector part 116 has an annular shape. An end of the fuel gas supply pipe 40 is inserted into one end side of the through hole 116a (i.e., an end remote from the heat exchanger body 54). An annular seal member 118 contacts a wall surface of the through hole 116a in an air tight manner. The annular seal member 118 is provided in the outer peripheral surface at an end of the fuel gas supply pipe 40.

The fuel gas inlet part 56a is inserted into the other end side of the through hole 116a (an end closer to the heat exchanger body 54). An annular seal member 120 contacts a wall surface of the through hole 116a in an air tight manner. The annular seal member 120 is provided in the outer peripheral surface of the fuel gas inlet part 56a.

The connector part 116 contains a pipe fixed part 122, a second fixed part 124, and a first coupling part 126 in an integrated manner. A pipe fixing part 48 is coupled to the pipe fixed part 122 by a pipe fastening member 50. In FIG. 3, the second fixing part 74 is coupled to the second fixed part 124 by a second fastening member 76. The first coupling part 126 has, formed therein, a hole 126a into which a fourth fastening member 128 such as a screw member is inserted.

The second arm 100 extends from the other end of the support part body 96 in the direction indicated by the arrow A2. A root of the second arm 100 has a third fixed part 130 in an integrated manner. The third fixing part 78 is coupled to the third fixed part 130 by the third fastening member 80. An extended end of the second arm 100 has a second coupling part 132 in an integrated manner. The second coupling part 132 has, formed therein, a hole 132a into which a fifth fastening member 134 such as a screw member is inserted.

As shown in FIG. 2, the holder part 90 is provided to cover the first injector 92 and the second injector 94. A first discharge channel 136 as a passage of the fuel gas discharged from the first injector 92, and a second discharge channel 138 as a passage of the fuel gas discharged from the second injector 94 are formed in the holder part 90.

The holder part 90 has a first coupled part 140 and a second coupled part 142. The first coupling part 126 is coupled to the first coupled part 140 by a fourth fastening member 128. The second coupling part 132 is coupled to the second coupled part 142 by the fifth fastening member 134. The support part 88 and the holder part 90 may be in the form of a single member.

The ejector device 46 includes an ejector body 144 coupled to the holder part 90. The ejector body 144 has, formed therein, an outlet channel 146 for guiding the fuel gas guided from the injector body 86, to the fuel cell stack 14. The outlet channel 146 communicates with the first discharge channel 136 and the second discharge channel 138. A diffuser 148 is provided in the fuel gas flow field 34.

Figure 5:
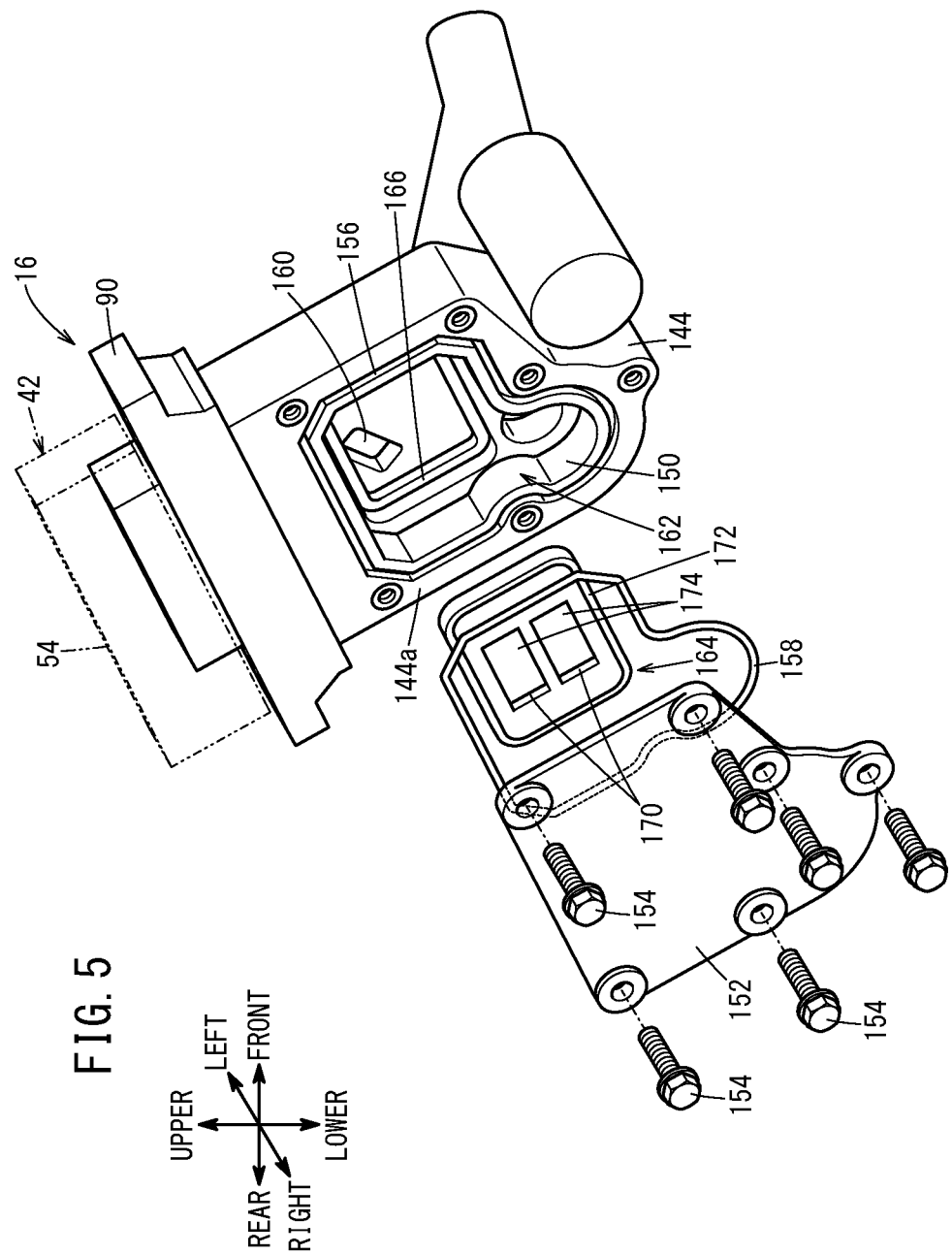
FIG. 5 is a partial exploded perspective view showing a fuel gas supply apparatus.

As shown in FIG. 5, a recess 150 opened toward the fuel cell stack 14 is formed in a surface 144a of the ejector body 144 facing the fuel cell stack 14. An opening of the recess 150 is closed by a cover member 152. The cover member 152 is fastened to an ejector body 144 by a plurality of fastening members 154 such as screw members. An annular groove 156 is formed around the recess 150, on the surface 144a of the ejector body 144. An annular seal member 158 is provided in the annular groove 156 in order to seal a gap between the cover member 152 and the ejector body 144 in an air tight manner.

Figure 6:
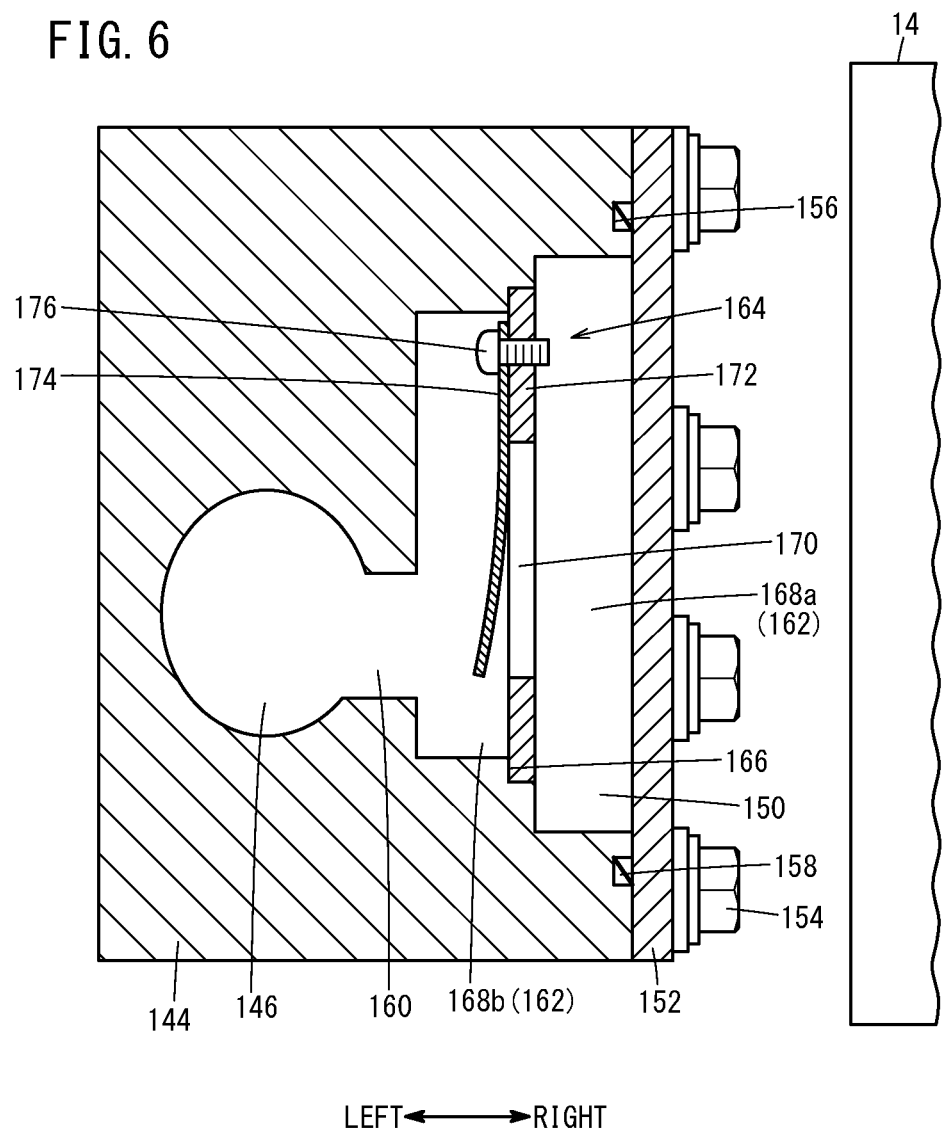
FIG. 6 is a cross sectional view showing a reed valve provided on an ejector device.

In FIGS. 5 and 6, a communication hole 160 communicating with the outlet channel 146 of the ejector body 144 is formed in a bottom surface of the recess 150. The recess 150 and the communication hole 160 form part of a circulating channel 162 which guides part of the fuel exhaust gas discharged from the fuel cell stack 14 to the upstream side of the diffuser 148 in the fuel gas flow field 34. A reed valve 164 is provided in the circulation channel 162.

Specifically, the reed valve 164 is provided at a step part 166 formed on a side surface of the recess 150. That is, in FIG. 6, the reed valve 164 is provided to divide the inside of the recess 150 into a first space 168a closer to the cover member 152 and a second space 168b closer to the communication hole 160. The first space 168a communicates with a fuel exhaust gas outlet (not shown) of the fuel cell stack 14. The second space 168b communicates with the fuel gas flow field 34 through the communication hole 160.

As shown in FIGS. 5 and 6, the reed valve 164 includes a support plate 172 fixed to the step part 166 and having two openings 170, and two plate shaped valve elements 174 provided on the support plate 172 to cover the respective openings 170. The reed valve 164 is provided in a manner that the thickness direction of the valve element 174 is oriented in the stacking direction of the plurality of power generation cells 20 (vehicle width direction, left-right direction).

The support plate 172 is fixed to the step part 166 in a manner that the thickness direction of the support plate is oriented in the vehicle width direction. The opening 170 has a rectangular shape in a plan view. The valve element 174 is a rectangular flat plate which can be elastically deformed, and provided on the support plate 172 in a manner to cover and close the opening 170 from the side where the communication hole 160 is positioned. One end of the valve element 174 is fastened to the support plate 172 by a fastening member 176 such as a screw member.

The valve element 174 is curved to warp in a direction away from the support plate 172, from an intermediate portion toward the other end in the longitudinal direction of the valve element 174 (see FIG. 6). The valve element 174 extends in the vertical direction. In FIG. 5, the reed valve 164 is positioned below the heat exchanger body 54. Stated otherwise, the reed valve 164 and the heat exchanger body 54 are arranged in a direction (vertical direction) perpendicular to the stacking direction of the plurality of power generation cells 20.

In the reed valve 164, the other end of the valve element 174 is spaced from the support plate 172 to thereby permit the flow of the fuel exhaust gas from the second space 168b into the first space 168a. The other end of the valve element 174 is pressed toward the support part 88 by the fuel gas guided to the second space 168b. Thus, the reed valve 164 prevents flow of the fuel gas from the second space 168b into the first space 168a.

Operation of the fuel cell system 10 will be described below.

In the fuel gas supply apparatus 16, a fuel gas supplied from the fuel gas tank (not shown) to the fuel gas supply pipe 40 is introduced into the heat exchanger body 54 through the fuel gas inlet part 56a (see FIG. 4B). In the heat exchanger body 54, the fuel gas is heated by heat exchange with the heating medium. As the heating medium, water warmed when it flows through the fuel cell stack 14 in order to cool the fuel cell stack 14 is used. The fuel gas heated by the heat exchanger body 54 is guided from the fuel gas outlet part 56b to the first inlet hole 110 and the second inlet hole 112 through the long hole 108 (see FIG. 4A).

Then, the fuel gas guided into the first inlet hole 110 is injected from the first injector 92 into the first discharge channel 136, and the fuel gas guided into the second inlet hole 112 is injected from the second injector 94 into the second discharge channel 138 (see FIG. 2). The fuel gas of the first discharge channel 136 and the fuel gas of the second discharge channel 138 are introduced into the fuel gas flow field 34 of the fuel cell stack 14 through the outlet channel 146 of the ejector device 46, and supplied to the anode 30 of the membrane electrode assembly.

The oxygen-containing gas guided from an oxygen-containing gas supply apparatus (not shown) into the oxygen-containing gas flow field 36 is supplied to the cathode 32 of the membrane electrode assembly 22.

Thus, in each of the membrane electrode assemblies 22, the fuel gas supplied to the anode 30 and the oxygen in the oxygen-containing gas supplied to the cathode 32 are consumed in electrochemical reactions in the electrode catalyst layers to perform power generation.

Then, the fuel gas supplied to the anode 30 is partially consumed to contain water, and then, the fuel gas is guided as the fuel exhaust gas, into the first space 168a of the circulation channel 162 through a fuel gas exhaust channel (not shown) and the gas liquid separator (see FIG. 6). The fuel exhaust gas guided into the first space 168a is sucked to the outlet channel 146 through the reed valve 164, the second space 168b, and the communication hole 160, and mixed with the fuel gas.

Next, advantages of the fuel cell system 10 and the fuel cell vehicle 12 according to the embodiment of the present invention will be described below.

In the embodiment of the present invention, the heat exchanger 42 is fixed to the support part 88 of the injector device 44. Therefore, it is possible to eliminate the need to arrange the pipes for coupling the heat exchanger 42 and the support part 88. Accordingly, it is possible to reduce the weight and the cost of the fuel gas supply apparatus 16, and arrange the injector device 44 and the heat exchanger 42 in a compact manner.

The heat exchanger 42 includes the heat exchanger body 54 provided in a space between the support part 88 and the fuel cell stack 14. In the structure, it is possible to constitute the fuel gas supply apparatus 16 in a more compact manner.

The heat exchanger 42 includes the fuel gas inlet part 56a for introducing the fuel gas into the heat exchanger body 54, and a fuel gas outlet part 56b for discharging the fuel gas from the inside of the heat exchanger body 54 to the outside. Each of the fuel gas inlet part 56a and the fuel gas outlet part 56b protrudes from the heat exchanger body 54 toward the support part 88.

In the structure, it is possible to suppress the weight and the cost of the fuel gas supply apparatus 16, and constitute the fuel gas supply apparatus 16 in a more compact manner.

The fuel gas supply apparatus 16 includes the fuel gas supply pipe 40 configured to guide the fuel gas to the fuel gas inlet part 56a. The support part 88 has, formed therein, the through hole 116a into which the end of the fuel gas supply pipe 40 and the fuel gas inlet part 56a are inserted.

In the structure, it is possible to effectively prevent leakage of the fuel gas from the coupling part between the fuel gas supply pipe 40 and the fuel gas inlet part 56a by the support part 88. Further, it is possible to avoid interference between the fuel gas supply pipe 40 and the support part 88, by the through hole 116a.

The support part 88 has, formed therein, the insertion hole 102 into which the fuel gas outlet part 56b is inserted. In the state where the fuel gas outlet part 56b is inserted into the insertion hole 102, the inner hole of the fuel gas outlet part 56b communicates with the fuel gas inlet channel 104.

In the structure, it is possible to effectively prevent leakage of the fuel gas at the time of guiding the fuel gas from the fuel gas outlet part 56b into the fuel gas inlet channel 104, by the support part 88. Further, it is possible to constitute the fuel gas supply apparatus 16 in a more compact manner.

The heat exchanger 42 includes the heating medium inlet part 58a configured to introduce heating medium into the heat exchanger body 54, and the heating medium outlet part 58b configured to discharge the heating medium from the inside of the heat exchanger body 54. Each of the heating medium inlet part 58a and the heating medium outlet part 58b protrudes from the heat exchanger body 54 toward the support part 88.

In the structure, since it is possible to dispose the heating medium inlet part 58a and the heating medium outlet part 58b in a space between the support part 88 and the heat exchanger body 54, it is possible to configure the fuel gas supply apparatus 16 in a more compact manner.

The fuel gas supply apparatus 16 includes the ejector device 46 provided on the injector device 44 side by side with the fuel cell stack 14 in the stacking direction of the plurality of power generation cells 20 (vehicle width direction). The ejector device 46 includes the outlet channel 146 configured to guide the fuel gas guided from the injector body 86, to the fuel cell stack 14, and the circulation channel 162 configured to guide part of the fuel exhaust gas discharged from the fuel cell stack 14, to the outlet channel 146. The circulation channel 162 is provided with the reed valve 164 including the plate shaped valve element 174, and the reed valve 164 is disposed in a manner that the thickness direction of the valve element 174 is oriented in the stacking direction of the plurality of power generation cells 20 (vehicle width direction).

In the structure, it is possible to reduce the size of the ejector device 46 in the stacking direction of the plurality of power generation cells 20 (vehicle width direction). Further, even if water (liquid droplets) contained in the fuel exhaust gas is attached to the valve element 174, it is possible to drop the liquid droplets downward. Therefore, it is possible to suppress freezing of the valve element 174 due to adhesion of liquid droplets to the valve element 174.

The reed valve 164 is disposed side by side with the heat exchanger body 54 in a direction perpendicular to the stacking direction. In the structure, it is possible to efficiently reduce the size of the fuel gas supply apparatus 16 in the stacking direction of the plurality of power generation cells 20 (in the width direction).

The fuel cell system 10 is disposed in a manner that the stacking direction of the plurality of power generation cells 20 is oriented in the vehicle width direction of the fuel cell vehicle 12. In the structure, it is possible to efficiently reduce the size, in the vehicle width direction, of the fuel gas supply apparatus 16.

Second Embodiment

Next, a fuel cell vehicle 12A according to a second embodiment of the present invention will be described. In the fuel cell vehicle 12A according to the embodiment of the present invention, the structural elements that are identical to those of the above described fuel cell vehicle 12 are labeled with the same reference numerals, and detailed description is omitted.

Figure 7:
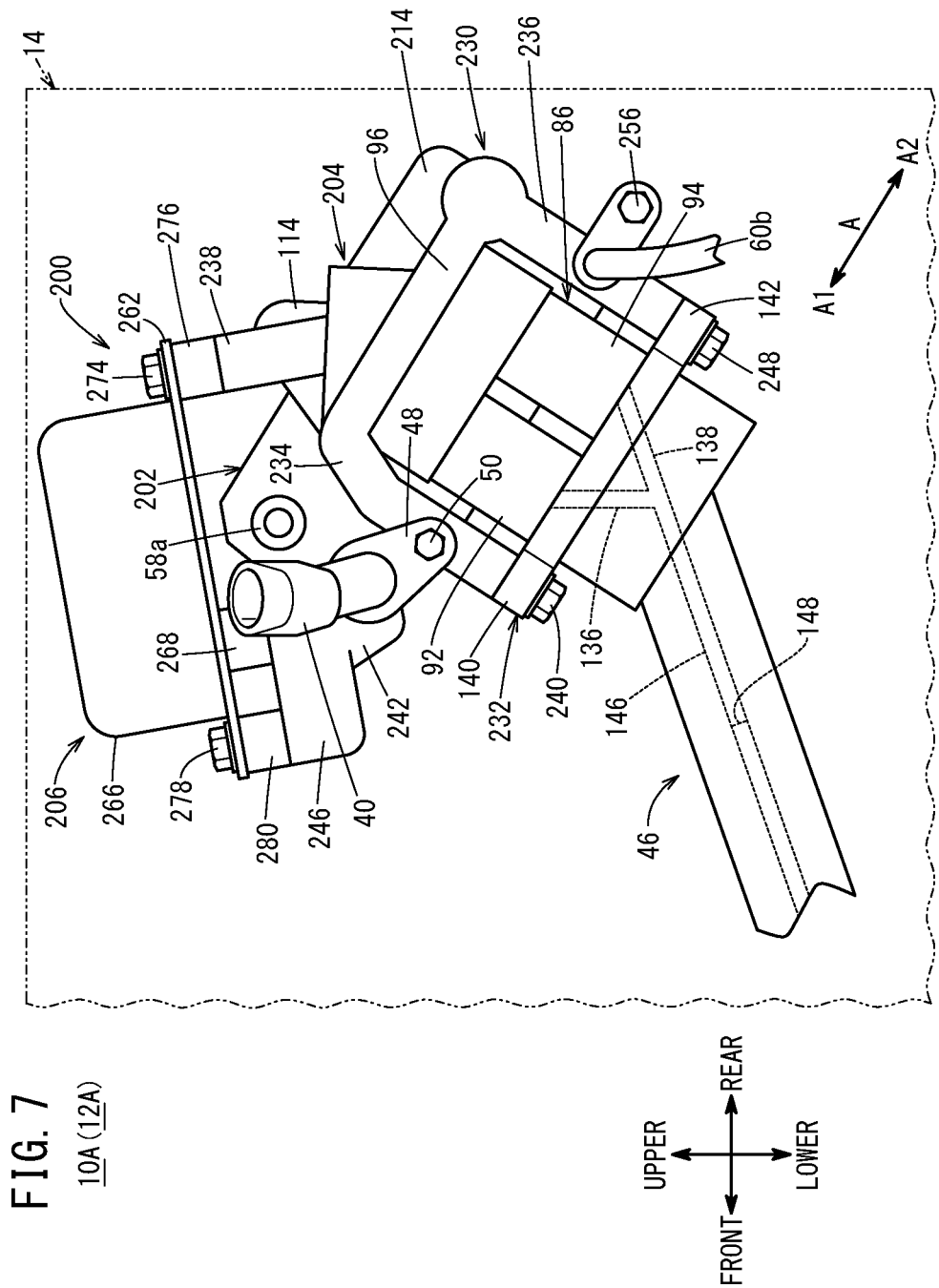
FIG. 7 is a front view showing a fuel gas supply apparatus of a fuel cell system according to a second embodiment of the present invention.

As shown in FIG. 7, a fuel cell system 10A is mounted in the fuel cell vehicle 12A. The fuel cell system 10A includes the fuel cell stack 14, a fuel gas supply apparatus 200, and an oxygen-containing gas supply apparatus (not shown).

The fuel gas supply apparatus 200 includes a fuel gas supply pipe 40, a heat exchanger 202, an injector device 204, a silencer 206, and an ejector device 46.

Figure 8:
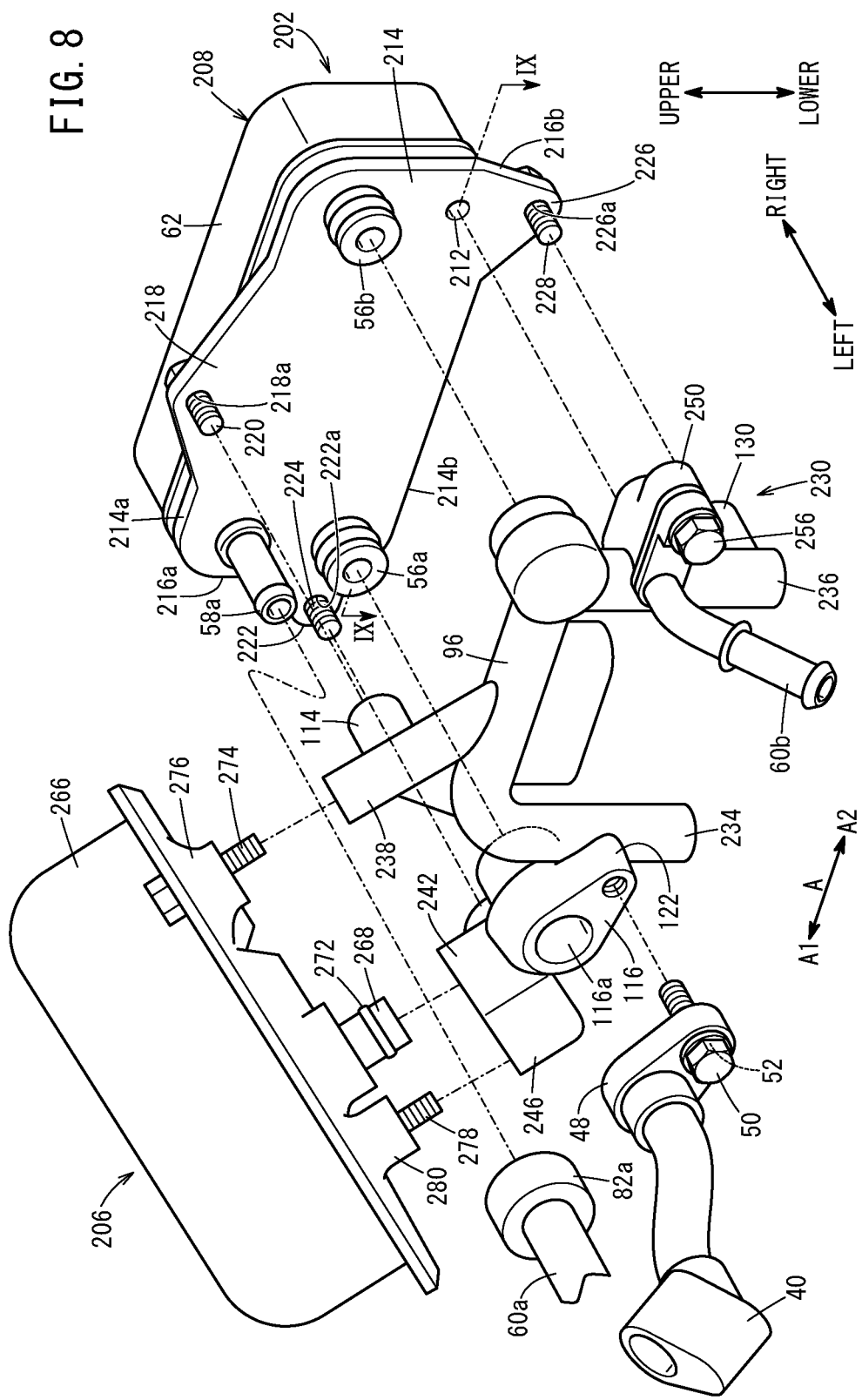
FIG. 8 is an exploded perspective view showing a fuel gas supply pipe, a heat exchanger, and a support part in FIG. 7.
Figure 9:
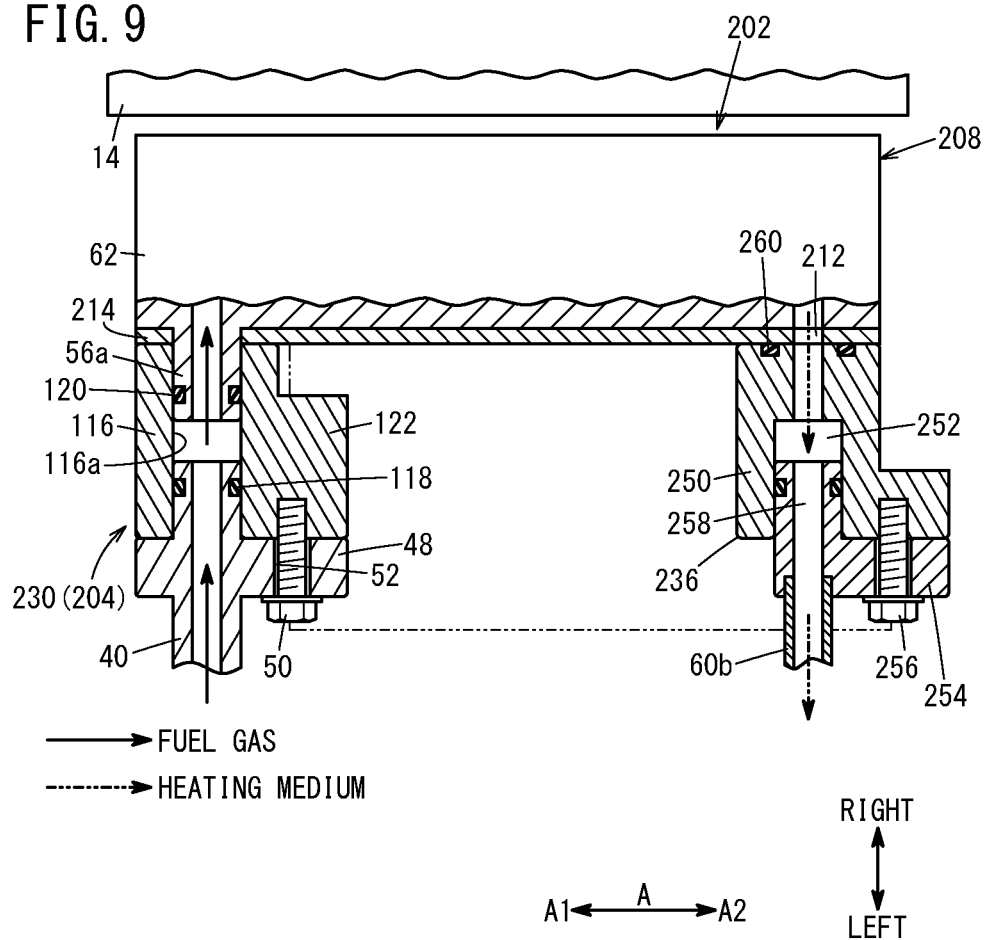
FIG. 9 is a lateral cross sectional view taken along a line IX-IX in FIG. 8.

As shown in FIGS. 8 and 9, the heat exchanger 202 includes a heat exchanger body 208, a fuel gas inlet part 56a, a fuel gas outlet part 56b, a heating medium inlet part 58a, a heating medium outlet part 212, a heating medium supply pipe 60a, and a heating medium discharge pipe 60b.

The heat exchanger body 208 is provided in a space between the support part 230 of the injector device 204 and the fuel cell stack 14 (see FIG. 9). The heat exchanger body 208 includes a container part 62, and a plate shaped lid part 214 fixed to the container part 62. The lid part 214 has a rectangular parallelepiped shape in a plan view.

In FIG. 8, the lid part 214 includes a first long side 214a positioned at an upper position, a second long side 214b positioned at a lower position, a first short side 216a positioned at one end of the lid part 214, and a second short side 216b positioned at the other end of the lid part 214.

A first fixing part 218 is provided at an intermediate position of the first long side 214a in an extension direction in which the first long side 214a extends. The first fixing part 218 protrudes in a direction away from the second long side 214b. A first insertion hole 218a is formed in the first fixing part 218. A first fastening member 220 such as a screw member is inserted into the first insertion hole 218a. A second fixing part 222 is provided at a lower end of the first short side 216a. The second fixing part 222 protrudes in a direction away from the second short side 216b.

The second fixing part 222 has, formed therein, a second insertion hole 222a into which a second fastening member 224 such as a screw member is inserted. The second long side 214b has, provided at the other end in the extension direction, a third fixing part 226 that protrudes in a direction away from the first long side 214a. The third fixing part 226 has, formed therein, a third insertion hole 226a into which a third fastening member 228 such as a screw member is inserted. The heating medium outlet part 212 is a hole for discharging the heating medium from the inside of the heat exchanger body 208.

The injector device 204 is arranged side by side with the fuel cell stack 14 in the stacking direction (vehicle width direction) of the plurality of power generation cells 20. Specifically, the injector device 204 is fixed to an end surface of the fuel cell stack 14 by a fixing member such as a screw member (not shown).

In FIGS. 7 and 8, the injector device 204 includes an injector body 86, a support part 230 provided on a heat exchanger 202, and a holder part 232 provided on the support part 230 to hold the injector body 86. The injector body 86 includes a first injector 92 and a second injector 94.

The support part 230 includes a support part body 96, a first arm 234, and a second arm 236. The support part body 96 guides the fuel gas discharged from the fuel gas outlet part 56b to the first injector 92 and the second injector 94.

The first fixed part 114 is provided at one end of the support part body 96. A first fixing part 218 is coupled to the first fixed part 114 by a first fastening member 220.

The first fixed part 114 integrally has a first attached part 238 for attaching the silencer 206.

In FIG. 7, the first arm 234 extends from one end of the support part body 96 along the first injector 92 toward the ejector device 46. The extended end of the first arm 234 is fixed to the first coupled part 140 of the holder part 232 by a fastening member 240 such as a screw member. A connector part 116 is provided at an intermediate portion of the first arm 234 in the extension direction thereof (see FIG. 8). An end of the fuel gas supply pipe 40 is connected to the connector part 116.

Figure 10:
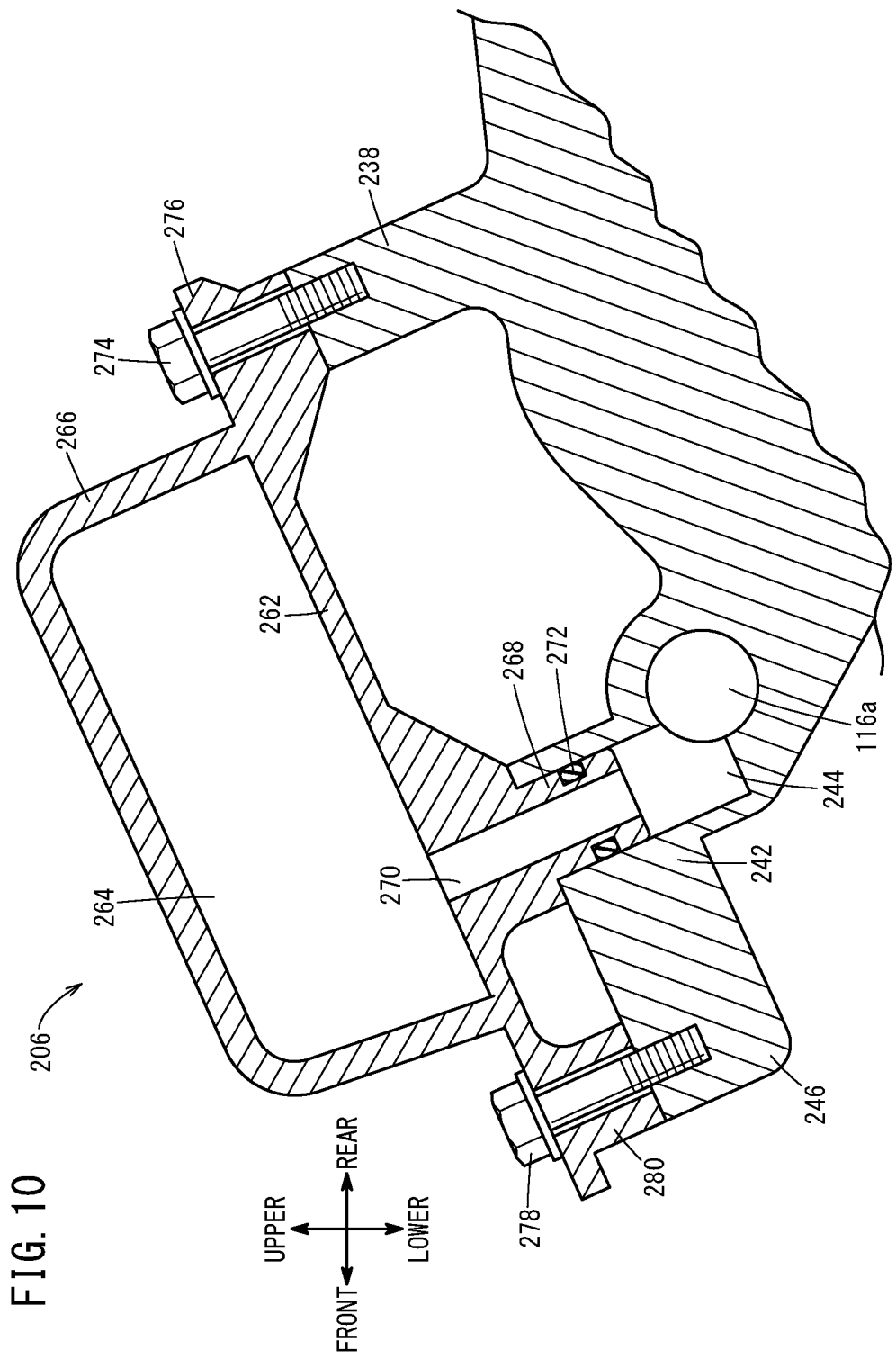
FIG. 10 is a cross sectional view with partial omission showing a silencer in FIG. 8 and an area around the silencer.

In FIGS. 8 and 10, the connector part 116 integrally has a diverging part 242 configured to guide the fuel gas guided from the fuel gas supply pipe 40 to the silencer 206. The diverging part 242 has, formed therein, a diverging hole 244 that is opened to a wall surface defining a through hole 116a into which an end of the fuel gas supply pipe 40 is inserted. The diverging part 242 integrally has a second attached part 246 for attaching the silencer 206.

As shown in FIG. 7, the second arm 236 extends from the other end of the support part body 96 along the second injector 94 toward the ejector device 46. The extended end of the second arm 236 is fixed to the second coupled part 142 of the holder part 232 by a fastening member 248 such as a screw member.

In FIG. 9, a connector part 250 for connecting an end of the heating medium discharge pipe 60b is provided so as to be integral with an intermediate portion of the second arm 236 in an extension direction in which the second arm 236 extends. A through hole 252 is formed in the connector part 250. A joint member 254 is fixed to the connector part 250 by a fastening member 256 such as a screw member.

The joint member 254 is inserted into one end of the through hole 252 (an end remote from the heat exchanger 202). The joint member 254 has, formed therein, a hole 258 for allowing the through hole 252 and the inner hole of the heating medium discharge pipe 60b to communicate with each other. The other end of the through hole 252 (an end closer to the heat exchanger 202) communicates with the heating medium outlet part 212. A seal member 260 is provided on a surface of the connector part 250 facing the lid part 214 of the heat exchanger 202. In the state where the seal member 260 is disposed around the other end of the through hole 252, the seal member 260 airtightly contacts the lid part 214.

As shown in FIG. 10, the silencer 206 includes a base part 262, and a chamber part 266 provided on the base part 262 to form a silencer chamber 264. The base part 262 has a silencer connector part 268 protruding in a direction away from the chamber part 266 and inserted into the diverging hole 244. The silencer connector part 268 has, formed therein, a connection channel 270 that connects the inside of the silencer chamber 264 with the inside of the diverging hole 244. A seal member 272 provided in an outer peripheral surface of the silencer connector part 268 airtightly contacts the wall surface defining the diverging hole 244.

The base part 262 further includes a first attaching part 276 coupled to the first attached part 238 by a fastening member 274 such as a screw member, and a second attaching part 280 coupled to the second attached part 246 by a fastening member 278 such as a screw member. The chamber part 266 has an inverted U shape in cross section.

In FIG. 7, the holder part 232 is provided to partly cover each of the first injector 92 and the second injector 94. A first discharge channel 136 and a second discharge channel 138 are formed in the holder part 232. The holder part 232 has a first coupled part 140 and a second coupled part 142.

This embodiment offers the same advantages as the above described first embodiment.

The present invention is not limited to the above described structure. In the fuel cell systems 10, 10A, the stacking direction of the plurality of power generation cells 20 may be oriented in the front-rear direction of the fuel cell vehicle 12.

The fuel cell system and the fuel cell vehicle according to the present invention are not limited to the above described embodiments. It is a matter of course that various structures can be adopted without departing from the gist of the present invention.

What is claimed is:

1. A fuel cell system comprising a fuel gas supply apparatus configured to supply a fuel gas to a fuel cell stack containing a plurality of power generation cells stacked together in a stacking direction,
    wherein the fuel gas supply apparatus comprises:
        an injector device disposed side by side with the fuel cell stack in the stacking direction of the plurality of power generation cells; and
        a heat exchanger configured to heat a fuel gas that is guided to the injector device;
    wherein the injector device comprises:
        an injector body; and
        a support part having a fuel gas inlet channel configured to introduce the fuel gas into the injector body, and configured to support the injector body; and
    wherein the heat exchanger is fixed to the support part.

2. The fuel cell system according to claim 1, wherein the heat exchanger comprises a heat exchanger body provided in a space between the support part and the fuel cell stack.

3. The fuel cell system according to claim 2, wherein the heat exchanger comprises:
    a fuel gas inlet part configured to introduce the fuel gas into the heat exchanger body; and
    a fuel gas outlet part configured to discharge the fuel gas from an inside of the heat exchanger body,
    and wherein each of the fuel gas inlet part and the fuel gas outlet part protrudes from the heat exchanger body toward the support part.

4. The fuel cell system according to claim 3, wherein the fuel gas supply apparatus includes a fuel gas supply pipe configured to guide the fuel gas to the fuel gas inlet part; and
    the support part includes, formed therein, a through hole into which an end of the fuel gas supply pipe and the fuel gas inlet part are inserted.

5. The fuel cell system according to claim 3, wherein the support part includes, formed therein, an insertion hole into which the fuel gas outlet part is inserted; and
    in a state where the fuel gas outlet part is inserted into the insertion hole, an inner hole of the fuel gas outlet part communicates with the fuel gas inlet channel.

6. The fuel cell system according to claim 2, wherein the heat exchanger comprises:
    a heating medium inlet part configured to introduce heating medium into the heat exchanger body; and
    a heating medium outlet part configured to discharge the heating medium from an inside of the heat exchanger body,
    and wherein each of the heating medium inlet part and the heating medium outlet part protrudes from the heat exchanger body toward the support part.

7. The fuel cell system according to claim 2, wherein the fuel gas supply apparatus comprises an ejector device provided on the injector device side by side with the fuel cell stack in the stacking direction,
    the ejector device comprises:
        an outlet channel configured to guide the fuel gas guided from the injector body, to the fuel cell stack; and
        a circulation channel configured to guide part of a fuel exhaust gas discharged from the fuel cell stack, to the outlet channel,
    and wherein the circulation channel is provided with a reed valve comprising a plate shaped valve element; and
    the reed valve is disposed in a manner that a thickness direction of the valve element is oriented in the stacking direction.

8. The fuel cell system according to claim 7, wherein the reed valve is disposed side by side with the heat exchanger body in a direction perpendicular to the stacking direction.

9. The fuel cell system according to claim 1, wherein the injector device is fixed to an end surface of the fuel cell stack in the stacking direction.

10. A fuel cell vehicle including a fuel cell system having a fuel gas supply apparatus configured to supply a fuel gas to a fuel cell stack containing a plurality of power generation cells stacked together in a stacking direction,
    wherein the fuel gas supply apparatus comprises:
        an injector device disposed side by side with the fuel cell stack in the stacking direction of the plurality of power generation cells; and
    a heat exchanger configured to heat a fuel gas that is guided to the injector device;
    wherein the injector device comprises:
        an injector body; and
        a support part having a fuel gas inlet channel configured to introduce the fuel gas into the injector body, and configured to support the injector body;
    wherein the heat exchanger is fixed to the support part; and wherein the fuel cell system is disposed in a manner that the stacking direction is oriented in a vehicle width direction of the fuel cell vehicle.

* * * * *